US006616957B1

(12) United States Patent
Wilhelm et al.

(10) Patent No.: US 6,616,957 B1
(45) Date of Patent: Sep. 9, 2003

(54) METHOD OF STABILIZING GRAHAM FLOUR, AND CRACKER PRODUCED FROM SAID FLOUR

(75) Inventors: Carolyn Louise Wilhelm, Hackettstown, NJ (US); Tim Michael Adrianson, Oak Ridge, NJ (US); Diane Louise Gannon, Perrysburg, OH (US); Edward Douglas Howey, Toledo, OH (US); Harold Ira Levine, Morris Plains, NJ (US); Patricia Ann Mozeke, Bedminster, NJ (US); Louise Slade, Morris Plains, NJ (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/723,378

(22) Filed: Nov. 28, 2000

(51) Int. Cl.[7] ................................................. A23L 1/10
(52) U.S. Cl. ..................... 426/241; 426/549; 426/622
(58) Field of Search ....................... 426/241, 507, 426/518, 520, 549, 618, 622

(56) References Cited

U.S. PATENT DOCUMENTS

| | | | |
|---|---|---|---|
| 4,737,371 A | 4/1988 | Bookwalter | |
| 5,362,510 A | 11/1994 | Mizoguchi et al. | |
| 5,382,441 A | 1/1995 | Lentz et al. | |
| 5,413,800 A | 5/1995 | Bell et al. | |
| 5,433,966 A | 7/1995 | Wolt et al. | |
| 5,523,109 A | 6/1996 | Hellweg et al. | |
| 5,759,602 A | 6/1998 | Kobussen et al. | |
| 5,773,066 A | 6/1998 | Satake et al. | |
| 5,972,413 A | * 10/1999 | Whitney et al. | 426/618 |
| 6,086,935 A | 7/2000 | Delrue et al. | |

FOREIGN PATENT DOCUMENTS

| | | |
|---|---|---|
| CA | 2082602 | 5/1993 |
| DE | 41 37 161 | 5/1993 |

OTHER PUBLICATIONS

Oat Check I, "Rapid Oat Product Testing for 'Cook' Quality", LSB Products, Sep. 1, 1993.
"Studies on Stabilization of Wheat Bran", R. Vetrimani et al., J.Fd.Sci.Technol., 1990, vol. 27, No. 5, 332–335.

"Storage Stability of Wheat Based Foods: A Review", D. Fellers et al., J. of Food Science, vol. 42, No. 5 (1977), 1143–1147.

"Enzymes in Wheat, Flour and Bread", P. Fox et al., Advances in Cereal Science and Technology, vol. 5, Pomeranz, Y., AACC (1982, pp. 107–156.

"Determination of Peroxidase Activity in Cereals", B. Fretzdorff et al., Lebensm Unters. Forsch., 170 (1980), pp. 187–193.

"Rancidity in Cereal Products", T. Galliard, Rancidity in Foods, 2d Edition, Allen, J., Hamilton, R., Elsevier Applied Science, New York, 1989, pp. 141–161.

"Hydrolytic and Oxidative Degradation of Lipids during Storage of Wholemeal Flour: Effects of Bran and Germ Components", T. Galliard, J. of Cereal Science 4 (1986), pp. 179–192.

"Studies on Stabilization of Wheat Germ", P. Rao et al., Lebensm–Wiss. u. Technol., 13, (1980), pp. 302–307.

"Infrared Cocoa Bean Pretreatment", Micronizer, Inc. Publication (no date available).

* cited by examiner

Primary Examiner—George C. Yeung
(74) Attorney, Agent, or Firm—Hollander Law Firm, P.L.C.

(57) ABSTRACT

A process is provided for making reduced fat, low fat or no-fat graham-based crackers and flour for the production thereof. The process for making the flour includes providing whole wheat berries having a moisture content of from about 15% by weight to about 20% by weight, radiating the berries with infrared (IR) energy, optionally maintaining the berries at an elevated temperature of from about 80° C. to about 110° C. for a period of time up to about one hour, and cooling, drying and comminuting the treated berries. The moisture content of the berries can be adjusted by moistening or tempering the berries prior to treatment with IR energy. The moisture content, optional tempering conditions, amount of irradiated IR energy, the elevated temperature, and the various treatment periods are sufficient to inactivate lipase and lipoxygenase in the berries yet insufficient to gelatinize more than about 20% of the starch in the berries. The graham flour has excellent shelf-life stability, and can be used to obtain machinable doughs on a mass production, continuous basis. Baked goods made from the flour have a surprisingly crunchy texture.

60 Claims, No Drawings

METHOD OF STABILIZING GRAHAM FLOUR, AND CRACKER PRODUCED FROM SAID FLOUR

FIELD OF THE INVENTION

The present invention relates to processes for making graham-based flours which exhibit low rancidity and extended shelf-life and to baked goods having a crunchy texture made from such flours. The present invention also relates to reduced fat, low fat, or no-fat baked goods, such as graham crackers and snacks, produced from such flours.

BACKGROUND OF THE INVENTION

Whole cereal grains and graham flour provide a high dietary fiber content but also provide natural lipids and enzymes, such as lipase and lipoxygenase (LPO), which may deleteriously interact during storage. The interaction of the lipids and enzymes can lead to rancidity problems such as off-flavors and odors in baked goods made from graham flour. Generally, to avoid rancidity problems in baked goods, graham flour is employed which is less than about ten days old.

Rancidity in cereal products may be due to hydrolytic (enzymatic) or oxidative degradation reactions, or both. Often, hydrolysis may predispose products to subsequent oxidative rancidity. Nature has provided a number of protective features in seeds to prevent rancidity and spoilage, enabling seeds to survive periods of adverse conditions before attaining an appropriate environment for germination and growth. Rancidity is less likely to develop when lipid materials, for example, seed oil, are unable to interact with reactants or catalysts such as air and enzymes. One protective feature in cereal grains is the provision of separate compartments for storing lipids and enzymes so that they cannot interact.

Milling cereal grains involves breaking down the separate compartments, bran, germ and endosperm, such that the lipid and enzymatic components of the grain are able to interact, greatly increasing the development of rancidity.

One problem with high-extraction flours, that is, those containing substantial amounts of bran and germ, is that they are less stable than white flours. Prolonged storage of high-extraction flours often leads to the development of rancidity. Rancidity includes adverse quality factors arising directly or indirectly from reactions with endogenous lipids, producing a reduction in baking quality of the flour, undesirable tastes and odors, or unacceptable functional properties. A main reason for the development of rancidity in high-extraction flours is the enzymatic degradation of unstable natural oils. Rich supplies of unstable natural oils are contained in the germ portion of grains used to make high-extraction flours. White flours, on the other hand, contain little or no unstable natural oils or fats because they are made from the endosperm portion of grains and are generally substantially free of bran and germ.

Another reason rancidity is a greater problem in products derived from bran and germ-containing flour is that bran and germ contain the enzymes involved in enzyme-catalyzed lipid degradation. One of the enzymes, lipase, causes hydrolytic rancidity in milling products of sound, ungerminated wheat. Lipase is found almost exclusively in the bran component. The other key lipid degrading enzyme, lipoxygenase (LPO), is present almost exclusively in the germ and also is involved in the development of rancidity. Thus, bran-containing flours or graham flours are much more susceptible to the development of rancidity than are white flours which contain little or no bran and germ.

Enzyme catalyzed lipid degradation that occurs in high extraction flour, causing rancidity in such flour, is believed to occur by the action of lipase followed by the action of LPO. When lipase, the enzyme found almost exclusively in the bran portion of the grain, is activated during milling, it reacts with unstable oils naturally occurring in the grain and breaks down the unstable oils to free fatty acids (FFA). This process may take weeks or even months. Then, LPO, the enzyme found almost exclusively in the germ portion of the grain, oxidizes FFA in the presence of oxygen producing volatile breakdown products such as peroxides that, in turn generate rancid aldehydes. In the absence of moisture, oxidation of FFA is also a very slow process and can take up to several weeks until noticeable amounts of rancid aldehydes can be detected. However in the presence of moisture, or water, which is normally added to flour in large amounts during the dough work-up stage, enzyme catalyzed oxidation of free fatty acids tends to proceed to a great extent very quickly causing formation of large amounts of rancid aldehydes in a matter of just a few minutes.

While steam and other heat sources may be used to inactivate enzymes, none have been employed in a manner to provide shelf-stable whole wheat berries and graham flour containing a low degree of gelatinized starch. Heat treatment of whole wheat berries using steam may be employed to inactivate enzymes such as lipase and LPO to provide shelf-stable flours upon milling and/or processing. However, steam heat treatment tends to substantially gelatinize starch in the berries or fails to substantially completely inactivate lipase and LPO. In Bookwalter, U.S. Pat. No. 4,737,371, for example, steam treatment for a 4–12 minute period of time only "significantly reduces" lipase activity but does not substantially inactivate lipase. When steam treating under conditions sufficient to substantially inactivate lipase and LPO, steam penetrates the berries and gelatinizes a substantial amount of starch in the interior endosperm of the berries. The moisture from steam induces gelatinization of starch in the berries, when combined with the heat brought to the interior of the berries by the steam. The excessive moisture which penetrates the berries during steaming also necessitates long drying periods to reduce the moisture content to an acceptable level for milling.

Dough containing highly gelatinized starch contents that result from steam treatments to inactivate enzymes, for example more than 20% of gelatinized starch, tends to be poorly machinable and require additives to improve processing. Additives including sugar are often added to improve the machinability of highly gelatinized graham flour. However, sufficient amounts of sugar needed to improve machinability are generally inappropriate for low-calorie applications, such as reduced fat, low-fat and no-fat crackers.

Whole wheat berries and graham flours having higher degrees of gelatinized starch may be acceptable for applications wherein crunchy baked products are desired. It has been found by the present inventors that crackers made from whole wheat flour having from about 5% to about 20% gelatinized starch obtained using infra-red heating are unexpectedly crunchier than crackers made from whole wheat flour having ungelatinized starch. Likewise, baked goods made from dough containing less than about 5% of gelatinized starch are not as crunchy as baked goods made from dough comprising flours having from about 5% to about 20% gelatinized starch. However, dough containing flour having more than 20% of gelatinized starch, e.g. more than about 25% gelatinized starch, tends to be too short, or not very elastic, and is thus poorly machinable because it tends to break and tear when sheeted.

Another problem encountered with unstable wheat flour is that wax paper packaging or other semipermeable packaging must be used to permit the escape of rancid odors from such products. Metallized film packaging has been avoided for such applications as they do not permit the escape of rancid odors which often accompany unstable whole wheat flour and products. Metallized film packaging is desirable, however, in the snack food industry because of its ability to preserve the freshness of a packaged product and to prevent the product from absorbing moisture and odors. Aesthetics requirements have also led to an increased use of metallized film packaging. Stable flours and baked goods that have long shelf-lives, for example, 45 days or longer, do not require semipermeable packaging because they do not produce sufficient amounts of rancid odor to require continuous release thereof from the packaging. Stable flours and baked goods can thus be packaged in non-permeable packaging. Unstable flours, including whole wheat and graham flours, and products, however, cannot be packaged in non-permeable materials. Therefore, it is desirable to provide shelf-stable graham or whole wheat flour and baked goods which can be packaged in metallized film packaging materials without a need to provide for an escape of rancid odors.

To avoid the excess gelatinization and moisture content in the interior of whole wheat berries that is caused by steam treating the berries to stabilize them, it is desirable to select a substantially steam-free form of enzyme-inactivating energy to treat the berries. Lipase is concentrated in the bran of whole wheat berries, and LPO in the germ. Accordingly, it is also desirable to focus enzyme-inactivating energy at the exterior portions of whole wheat berries where the bran and germ are located. Localizing the energy applied to the exterior parts of the berries enables substantial or complete inactivation of lipase and LPO in the entire berries without substantially treating the interiors of the berries where starch is prevalent. Thus, by concentrating an irradiative energy source, for example infrared (IR) radiation, in a controlled fashion on the exterior of the berries, heating and gelatinization of starch in the endosperm portions of the berries are minimized.

The present invention is based on the need for shelf-stable whole wheat berries and graham flour having a low degree of gelatinized starch. The present invention provides a process for making shelf-stable whole wheat berries and graham flour having a low degree of gelatinized starch and which yield a crunchy texture in baked goods. The present invention also provides a process for making reduced fat, low-fat or no-fat graham-based crackers which have a crunchy texture and a long shelf-life.

The present invention provides a process for inactivating enzymes in whole wheat berries which cause degradation of natural lipids in milled whole cereal grains. A controlled, localized application of lipase and LPO inactivating energy at the surface of the berries provides a degree of starch gelatinization which does not adversely affect dough machinability, without the need for additives. The graham flours produced according to the invention possess a stable shelf life which exceeds 45 days. A crunchy texture is unexpectedly exhibited in baked goods baked from the stabilized graham flour. Also, the present invention delivers consistent functionality to baked products and allows the use of metallized packaging films without detrimental effects.

The present invention also provides a method of whole wheat berry stabilization which meets the standard of identity for ingredient labeling identifying the wheat component as "whole wheat". Whole wheat that is stabilized by removing the bran, stabilizing it, and then recombining with the unstabilized wheat components cannot be considered or labeled "whole wheat" since the supplier cannot guarantee that the proportion of the components after recombining are consistent with the proportions in whole wheat before stabilization. According to the present invention, whole wheat berries are treated and products incorporating flour made from such berries can properly be labeled "whole wheat."

SUMMARY OF THE INVENTION

The present invention relates to a process for making shelf-stable graham flour which yields a crunchy texture in baked goods, wherein the flour is made from whole wheat berries treated under conditions that inactivate lipase and lipoxygenase (LPO) yet gelatinize less than about 20% of the starch in the berries. The present invention relates to a process for making reduced fat, low fat or no fat baked goods such as graham crackers or snacks which have a crunchy texture and a long shelf-life.

In accordance with the present invention, a graham flour is made from whole wheat berries that have significantly reduced lipase and LPO enzyme activity. To achieve significant reduction in enzyme activity, according to the present invention, berries of a specified moisture content are irradiated by an infrared (IR) energy source until a desired berry surface temperature is achieved. The irradiated berries are then cooled, dried and comminuted. The berries may first be moisturized with water for a period of time to achieve a desired moisture level. Also, the berries may optionally be maintained at an elevated temperature for a period of time after irradiation treatment. The moisturizing conditions, amount of IR irradiation, temperatures, and periods of time for IR treatment and subsequent heat treatment are chosen to be sufficient to at least substantially inactivate lipase and LPO in the berries yet insufficient to gelatinize more than about 20% of the starch in the berries. Starch gelatinization may generally range from about 5% to about 15% as measured by differential scanning calorimetry. The graham flour obtained by the method of the present invention has an excellent shelf-life. Additionally; baked goods made from the flour have both an excellent shelf-life and a surprisingly crunchy texture.

The shelf-stable whole wheat or graham flour may be produced in accordance with the method of the present invention by:

(1) providing whole wheat berries having a moisture content of from about 15% by weight to about 20% by weight, if necessary by moistening the berries to achieve said moisture content;

(2) subjecting the moistened whole berries to a heat treatment including IR energy for a first period of time to heat the berries to a first temperature of from about 90° C. to about 120° C.;

(3) cooling the heated berries after said first period of time to a temperature of about 73° C. or lower to substantially prevent further gelatinization of starch in the berries;

(4) drying the berries to a moisture content of from about 10% to about 15%; and (5) comminuting the berries to obtain a graham flour.

After IR energy treatment and before cooling, the berries may also be held for a second period of time at an elevated temperature of from about 80° C. to about 110° C. The second period of time may range up to about two hours or more. The optional elevated temperature treatment can improve inactivation of enzymes in the berries, although some further gelatinization of starch usually occurs. The first and second periods of time are preselected to achieve substantial inactivation of lipase and LPO in the berries without gelatinizing more than 20% of starch in the berries. The optional elevated heat treatment can also help reduce the moisture content of the berries, thereby reducing or eliminating the need for drying the berries to reduce moisture.

Initial moistening of the berries may not be needed if the berries to be treated have a moisture content of from about 15% by weight to about 20% by weight prior to treatment. If employed, the moistening step involves moistening whole wheat berries under conditions which result in a relatively higher concentration of moisture in exterior portions of the berries than in the interior portions of the berries. In accordance with the present invention, moistening times are limited to periods of time sufficient to absorb an added amount of water, yet of insufficient length to allow substantial deep absorption of water into interior portions of the berries. The moisture gradient facilitates inactivation of lipase and LPO in the outer portions of the berry while limiting gelatinization of starch in the inner, endosperm portion of the berry.

Reduced fat, low fat, or no-fat baked goods such as graham crackers and snacks may be produced in accordance with the present invention by admixing the whole wheat or graham flour obtained by the IR enzyme inactivation process of the present invention with ingredients comprising water to form a machinable dough. The dough may be formed into pieces, and the pieces may be baked to obtain crunchy-textured baked goods.

The present invention provides an improved raw material stability and provides graham flour having a shelf life of greater than 30 days, for example 45 days or more, delivers consistent functionality to baked products, allows the use of metallized packaging films without detrimental effects upon flavor or aroma, and provides an unexpectedly crunchy-textured, shelf stable baked good. In addition, the present invention provides a method of treating whole wheat berries without the need to remove, treat and recombine portions of the berries. Therefore, the term "whole wheat berries," as it is used in the present invention, refers to berries that include all of the bran, germ and endosperm portions intact. The ingredient listings for products containing the treated berries or flours of the present invention can therefore identify the wheat as whole wheat.

DETAILED DESCRIPTION OF THE INVENTION

The present invention relates to a process for making low rancidity shelf-stable graham flour having an unexpectedly long shelf life and which forms a machinable dough. The machinable dough is bakeable to an unexpectedly crunchy texture and provides baked goods having an extended shelf life. The present invention provides a process for inactivating lipase and lipoxygenase (LPO) in whole wheat berries, while achieving a degree of starch gelatinization in the berries of about 20% or less, preferably 15% or less, as measured by differential scanning calorimetry (DSC). The present invention also relates to a process for making reduced fat, low fat or no-fat graham-based crackers which have a crunchy texture and a long shelf-life.

Substantial inactivation of lipase and LPO is critical in accordance with the present invention because these two components are believed to be primarily responsible for enzyme catalyzed rancidity of the graham flour. However, it may be difficult to eliminate activity of both these enzymes without treating the grains and gelatinizing starches to an undesirable level. In the preferred embodiment of the present invention: a) the lipase activity is negative (as measured, for example, by an OAT-CHECK lipase enzyme activity test kit available from LAB PRODUCTS, A division of ALTECA, Inc. Kansas, USA), and b) the amount of LPO is less than about 10%, preferably less than 5% of the original amount of LPO present in untreated berries. In the most preferred embodiment, both lipase and LPO activities are completely eliminated, while the extent of gelatinization of starch in the grains remains below 20%.

Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," *Cereal Foods World,* Vol. 33, No. 3, pgs. 306–311 (March 1988).

In accordance with the present invention, a process for making graham flour having reduced or completely eliminated lipase and LPO enzyme activity is provided wherein IR energy is used to irradiate moistened whole wheat berries for a first period of time sufficient to raise the temperature of the berries to from about 90° C. to about 120° C., as measured with a temperature probe inserted into and centrally positioned within the lot of the treated berries to measure their surface temperature.

In accordance with a preferred embodiment of the invention, infrared (IR) energy is used to heat the berries to a temperature of from about 95° C. to about 115° C., with the range of from about 100° C. to about 110° C. being more preferred for some applications. For example, in a preferred embodiment of the invention, berries are treated with IR energy until they reach a temperature of about 105° C., however the temperature may vary depending on subsequent treatment of the berries. The first period of time sufficient for IR treatment to inactivate lipase and LPO ranges from 10 seconds to 2 minutes, preferably from 30 seconds to 60 seconds.

The use of IR energy is an important feature in accordance with the present invention. According to the invention, it has been determined that because lipase is concentrated in the bran of whole wheat berries, and LPO in the germ, it is desirable to focus enzyme-inactivating energy at the exterior portions of whole wheat berries where the bran and germ are located. Localizing the energy applied to the exterior parts of the berries enables substantial or complete inactivation of lipase and LPO in the entire berries without substantially irradiating the interiors of the berries where starch is prevalent. Thus, by concentrating the energy source on the exterior of the berries, heating and gelatinization of starch in the endosperm portions of the berries are minimized. IR irradiation treatment allows for controlled localized application of energy, thus enabling the achievement of the desired goal of surface treatment of berries. Subsequent heat treatment may be needed to enhance the effect of IR irradiation treatment in inactivation of lipase and LPO.

In accordance with the present invention, IR energy is supplied by a source which emits wavelengths of electromagnetic energy in the IR region, preferably in the range of from about 1.8 microns to about 3.4 microns. According to some embodiments of the invention, the source emits wavelengths of energy in the range of from about 2.2 to about 3.0 microns. Suitable devices for infrared treatment of the berries according to the methods of the present invention are IR energy treatment devices known as micronizers, available from Micronizer, Inc.

The wavelengths of electromagnetic energy used according to the invention penetrate whole wheat berries only to a shallow depth, and can be controlled so as not to substantially heat the endosperm portions of the berries. Thus, the portions of berries most affected by the irradiated energy are exterior portions, where bran and germ are located. As a result, the enzymes in the exterior portions of the berries are primarily affected and inactivated by the emitted radiation. The bran and germ absorb the major proportion of the IR radiation, thus allowing for effective treatment of lipase and LPO concentrated in the bran and germ without exposing interior portions of the berries to high amounts of energy from the source. Much higher wavelengths of energy, for example, in the 20 centimeter to 50 centimeter range, would not be useful according to the invention because such wavelengths would penetrate deeper into the berries and cause substantial gelatinization of starch in interior portions thereof. By using wavelengths of energy in the IR region, enzymes in exterior portions of the berries can be inactivated without substantially affecting or gelatinizing starch in interior portions to such an extent as would deleteriously affect dough machinability.

In accordance with the present invention, a combined IR energy and heat treatment is used to substantially inactivate lipase and LPO in moistened whole wheat berries, while gelatinizing only from about 5% to about 20% of starch in the berries, preferably from about 7% to less than about 15%, more preferably from about 8% to about 12% as determined by differential scanning calorimetry (DSC). At a lower extent of gelatinization, for example, less than about 5%, machinability is good but baked products made from the dough are not as crunchy as products made from dough of flour having about 5% to about 20% starch gelatinization. At a higher extent of starch gelatinization, for example, more than 20%, dough made from the resulting flour tend to be too short, that is, not very elastic, and is thus difficult to machine because it breaks and tears when sheeted.

Another way to determine whether berries have been overtreated or over gelatinized is to measure peroxidase enzyme activity. Peroxidase is another enzyme which is primarily found in the bran layer. Peroxidase enzyme does not participate or catalyze rancidic lipid degradation, and, therefore, its activity need not to be altered or suppressed. However, measuring of peroxidase activity can be used as an indicator of inactivation of either lipase or LPO. It also can be used as an indicator of possible overtreatment of whole wheat berries. Peroxidase enzymes are much more stable than either lipase or LPO, and their deactivation in whole wheat berries requires prolonged treatment at high temperatures. Complete inactivation of peroxidase enzyme in graham flour obtained in accordance with the present invention, therefore, would most likely indicate complete inactivation of both the lipase and LPO enzyme activities. However, complete inactivation of peroxidase would also indicate overtreatment of the berries, resulting in a high degree of gelatinization.

According to the present invention, the moisture content of the berries is also controlled to provide substantial lipase and LPO inactivation with minimal starch gelatinization. The berries may be treated or tempered such that exterior portions of the berries are moistened without substantially moistening interior portions thereof. Such treatment enhances the absorption of IR energy at exterior portions of the berries, with little penetration of IR energy to interior portions of the berries. By moistening the exterior portions, and not the interior portions of the berries, the present invention enables absorbed energy to be concentrated in exterior portions of the berries, where lipase and LPO are stored.

In accordance with the present invention, exterior portions of whole wheat berries can be moistened without substantially moistening interior portions of the berries. Tempering methods which can be used to accomplish a moistening treatment according to the invention include soaking the whole wheat berries for limited time periods in a bath or vat, for example. In other embodiments, the whole berries may be surface sprayed with water and permitted to soak or temper. Soaking or tempering times of from about 10 minutes to about 120 minutes may be employed according to some embodiments of the invention, but soaking for about 30 minutes to about 90 minutes is preferred. Soaking the berries for a longer time period is not desirable because it may result in deep penetration of water into the berries, moistening the interior portion of the berries. Berries subject to long tempering times and subsequently treated with IR energy tend to exhibit a higher amount of starch gelatinization when compared to berries tempered for shorter periods of time and irradiated to the same exterior temperature.

Tempering treatments which substantially avoid moisture penetration deep into the interiors of berries result in lower degrees of starch gelatinization when compared to deep moistening treatments. In accordance with the present invention, tempering is conducted for a long enough period of time to moisten exterior portions of berries and achieve a desired overall moisture content, but for a short enough period of time to minimize moistening of interior portions of the berries. The period of time for tempering also depends upon the desired amount of moisture to be added to the berries, with longer tempering times needed to add more moisture to the berries and shorter tempering times needed to add less moisture.

The moisture content of the berries immediately prior to IR treatment can be critical to achieving inactivation of lipase and LPO with only about 20% or less gelatinization. According to embodiments of the present invention, whole wheat berries are moistened or tempered for a period of time to achieve a moisture content of from about 15% by weight to about 20% by weight, with amounts of from about 17% by weight to about 19% by weight being preferred, for example, 18% by weight.

Natural whole wheat berries generally have a moisture content of from about 10% by weight to about 14% by weight. Accordingly, in embodiments of the invention, substantial amounts of water are added to raise the moisture content to an acceptable level for IR energy treatment. Adding from about 2% by weight to about 5% by weight water to the berries is generally preferred for moistening whole wheat berries, with added water amounts of from about 3.5% by weight to about 4% by weight being more preferable for tempering untreated whole wheat berries. Exceptionally dry untreated berries may require as much as about 9% by weight added water to achieve a moisture content of about 19% by weight, whereas exceptionally moist untreated berries may only require the addition of about 1% by weight of water, or no water at all.

In accordance with the present invention wherein a heat-treatment is used to subsequently treat the berries after exposure to IR energy, the subsequent heat treatment preferably involves maintaining the IR energy-treated berries in holding bins at a surface temperature of from about 80° C. to about 110° C., more preferably from about 85° C. to about 100° C., for a period of time of up to about one hour, or longer. Generally, the treatment time may be at least about 8 minutes. As the period of time increases, the degree of starch gelatinization generally increases. However, when the IR energy treatment does not by itself sufficiently inactivate lipase and LPO in the berries, the berries may be maintained at an elevated temperature to complete substantial inactivation of the enzymes.

Holding or residence times may vary depending upon each of the temperature at which the treated berries are maintained and the temperature achieved during the IR treatment stage. Treatments for more than about one hour may cause substantial gelatinization of starch in the berries. For embodiments wherein IR energy treatment of the berries results in a surface temperature of from about 100° C. to about 110° C., subsequent heat treatments at temperatures of from about 85° C. to about 95° C. for up to 10 minutes are preferred, more preferably from about 8 minutes to about 10 minutes. For embodiments wherein IR energy treatment of the berries results in a temperature of about 120° C., it is preferred not to use a subsequent heat treatment but instead to immediately cool the berries after IR exposure, or to cool the berries shortly after exposure, for example, within about 20 minutes.

Cooling the berries after IR energy treatment or after IR energy and subsequent heat treatment can be controlled to further minimize undesired gelatinization of starch. According to some embodiments of the invention, rapid cooling of the heated berries is preferred, for example, with chilled or room temperature ambient air. The berries are usually cooled to a surface temperature below 73° C. within 60 minutes. Then the berries are cooled to room temperature, or about 25° C. A temperature of 73° C. is a critical temperature because generally no further significant gelatinization occurs in the berries at temperatures lower than 73° C. In embodiments wherein IR energy-treated berries are cooled immediately after IR treatment, the average cooling rate used to achieve a surface temperature of about 25° C. is preferably a temperature decrease of from about 1° C. per minute (1° C./min) to about 3° C./min over a period of up to about 30 minutes, with average cooling rates of about 2° C./min over a period of up to about 30 minutes being more preferred. In embodiments wherein IR energy-treated berries are subsequently heat-treated and then cooled after heat-treatment, the cooling rate to achieve a surface temperature of about 25° C. preferably averages a temperature decrease of from about 1° C./min to about 3° C./min, with cooling rates of about 2° C./min being more preferred.

Higher cooling rates of more than about 3° C./min, result in a more rapid decrease in surface temperature and can be used with shorter cooling periods. Lower cooling rates of less than about 1° C., result in a slower decrease in surface temperature, and can be employed with longer cooling periods.

The cooling rate should be selected to minimize further gelatinization of starch in the berries after IR energy treatment or after heat-treatment, but should not be so fast as to prevent further inactivation of lipase and LPO, if needed. If no further inactivation of lipase or LPO is desired, cooling should be conducted to quickly reduce the temperature of the treated berries to less than about 73° C. For example, a higher cooling rate may be employed for initial cooling of the treated berries, followed by a lower cooling rate. Also, the cooling rate can be selected to dry the berries to various degrees. For example, longer cooling periods at lower cooling rates provide drier berries when compared to berries cooled at higher cooling rates for shorter periods of time.

A cooler or cooling device is preferably located at the exit of a bin, for example a surge bin, which receives heat-treated berries. Herein, the term "heat-treated" refers to berries which have been IR energy treated, with or without a subsequent treatment at an elevated temperature. The cooler may be located, for example, adjacent the exit of a bin used as an IR energy treatment device. The cooling device may instead be arranged at the exit of a holding bin or surge bin wherein berries are held for a period of time at an elevated temperature. Whole berries may be fed to the cooler by a rotary feeder disposed at a holding bin or surge bin exit.

Coolers which may be used for the processes of the invention include cooling tubes or cooling tunnels through which berries pass under the force of gravity or on a conveyor device. While the heat-treated berries pass through the device, cooled air is passed over and through the berries. The spent cooling air may then be collected or suctioned off, for example, by a hood, and further treated in a cyclone separator. A preferred cooler supplies cooling air to various regions along the length of a cooling tube or tunnel. Preferably, the cooling air is passed through a chilling device prior to contacting the berries to achieve a temperature which is lower than that of ambient air. The cooled berries exiting the cooler can be immediately milled or bagged.

Coolers having a tubular or tunnel-like construction are preferred according to the present invention. When employed, berries having a high surface temperature are fed or otherwise directed to a cooler entrance. A surface temperature profile for the cooler can be extrapolated by measurements of surface temperature of berries along the length of the cooler. Probes positioned at various distances along the cooler can provide such temperatures.

After cooling, the moisture content of the berries may further be reduced by drying. Drying temperatures of less than about 73° C. are preferred so that no further gelatinization of starch occurs during the drying process. In accordance with the present invention, drying temperatures range from about 0° C. to about 73° C. However, drying at ambient temperature is less expensive than drying at a cooler temperature and will prevent further gelatinization of the starch in the berries during drying. Drying is preferably conducted in an atmosphere having a low relative humidity, and may preferably be conducted in a reduced pressure atmosphere. In accordance with the present invention, drying may be performed until the moisture content of the berries is reduced to within the range of from about 10% by weight to about 15% by weight, preferably from about 12% by weight to about 14% by weight.

If the IR energy treatment and the optional further heat treatment achieve moisture contents within a desired range, no drying step is deemed necessary. Moisture contents of from about 10% by weight to about 15% by weight are preferred for milling purposes, to with moisture contents of about 12.5% by weight to about 13% by weight being particularly preferred. If there is too little moisture in the berries, the berries will undesirably shatter, creating a damaged starch product that is difficult to mill. Too high an amount of moisture renders the berries susceptible to excessive starch gelatinization and also causes the berries to be difficult to mill. For these reasons, dried berry moisture contents of from about 12% by weight to about 14% by weight are preferred just prior to milling.

If the moisture content in the heat-treated berries is too low, moisture may be added to the dry berries prior to milling to increase the moisture content to an acceptable level for milling. A tempering operation performed after IR energy treatment of the berries is referred to herein as "post-treatment tempering." The post-treatment tempering may be performed in a manner similar to the pre-treatment tempering. The moisture content of the treated berries can be increased by post-tempering for a period of time, for example, from about 10 minutes to about 240 minutes. According to a preferred embodiment of the invention, tempering is conducted to bring the moisture content of the berries up to from about 12% by weight to about 15% by weight. The desired increase in moisture is generally much less than the increase achieved by pre-treatment tempering. Accordingly, post-treatment tempering may be conducted for shorter periods of time than pre-treatment tempering. Post-treatment tempering generally adds from about 2% by weight to about 5% by weight of water to the whole wheat berries. The amount of water which should be added by a post-treatment tempering can be determined, based on the weight of the treated berries, as the difference between the measured moisture content and the desired moisture content. Thus, for example, if the measured moisture content of treated berries is 11.5% by weight and a moisture content of 12.5% by weight is desired, 1% by weight moisture should be added to the berries, or one pound of water should be added for every 100 pounds of treated berries.

Methods according to the present invention provide treated whole wheat berries having degrees of starch gelatinization of about 20% or less as measured by the DSC method. In addition to achieving a desired degree of gelatinization, the solvent retention capacity (SRC) of the flour from the treated berries of a desired value can be achieved according to the methods of the present invention. SRC is a physical property that determines usefulness of the berries in a subsequent baking process. SRC is an indirect measurement of the extent of starch gelatinization and it generally exhibits a direct correlation with the results obtained from the DSC measurements. SRC functionally shows how the flour will behave in baking a product. SRC values of from about 65 to 91 are acceptable values, with from about 70 to about 75 being preferred. SRC values of greater than or equal to about 91 generally correspond to degrees of gelatinization of greater than 20% and to over-treated berries, and thus are undesirable.

In accordance with the present invention, the graham flour of the invention is admixed with cracker ingredients including water to form a dough. The dough may be continuously produced and machined, for example sheeted, laminated, and cut, on a mass production basis. The dough is then formed into pieces and the pieces are baked to obtain a cracker having a crunchy texture. Baking generally inactivates any residual lipase and LPO in the flour. Accordingly, shelf-stability of the baked products is not as much of a concern as the stability of the graham flour or the raw dough.

In addition to water, cracker ingredients which may be admixed with the graham flour of the present invention include enriched wheat flour, vegetable shortening, sugar, salt, high fructose corn syrup, leavening agents, flavoring agents and coloring agents. Enriched wheat flours which may be used include wheat flours enriched with niacin, reduced iron, thiamine mononitrate and riboflavin. Vegetable shortenings which may be used include those made of partially hydrogenated soybean oil. Leavening agents which may be used include calcium phosphate and baking soda. Coloring agents which may be used include vegetable coloring agents such as annatto extract and turmeric oleoresin.

Dough made in accordance with the present invention includes dough comprising various combinations of the aforementioned cracker ingredients. According to some embodiments, all of the foregoing cracker ingredients are homogeneously admixed and the amount of water is controlled to form a cracker dough of desired consistency. The dough may then be baked to produce crackers having a crunchy texture. The baked goods produced in accordance with the present invention may be crackers or cookies having a full content or they may be a reduced fat, low-fat, or no-fat product.

As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

The present invention provides an improved raw material stability and greater than 30 day shelf life, for example 45 days or more, delivers consistent functionality to baked products, allows the use of metallized packaging films without detrimental effects, and provides an improved product quality relative to products made from similar, but untreated, whole wheat berries. In addition, the present invention provides a continuous method of treating whole wheat berries without removing, treating and recombining portions of the berries. The ingredient listings for products containing the treated berries or flours of the present invention can therefore identify the wheat as whole wheat.

The present invention is illustrated by the following non-limiting examples wherein all parts, percentages, and ratios are by weight, all temperatures are in ° C., and all temperatures are atmospheric, unless indicated to the contrary:

EXAMPLES

METHODS AND PROCEDURES

The following methods and procedures were used in determining properties and characteristics of the products used or obtained by the methods and processes according to the present invention:

Degree or extent of gelatinization is measured by differential scanning calorimetry or DSC analysis. The DSC method comprises (1) grinding treated whole wheat berries in a coffee grinder, (2) mixing the grinds at a 1:1 by weight ratio with water, and performing differential scanning at from 15° C. to 130° C. at a temperature increase rate of 10° C./min.

An SRC value is measured by mixing a sample of flour, having a weight (A), usually about 5 g, with a large excess of water and centrifuging the water-flour mixture. The supernatant liquid is then decanted and the sample is weighed to obtain the weight of the centrifuged wet sample (B). The SRC value is then calculated as follows:

$$SRC=[(B-A)/A]\times 100$$

Lipase activity is measured using an OAT-CHECK lipase enzyme activity test kit available from LAB PRODUCTS, A division of ALTECA, Inc. Kansas, USA. Appearance of a blue color of any shade is a positive test indicating lipase enzyme activity.

Lipoxygenase (LPO) activity is measured for graham flour by monitoring the rate of oxygen consumption of the enzyme extract, using the ammonium salt of linolenic acid as the substrate. Enzyme is extracted from the graham flour by recovering the supernatant portion of the flour homogenized in 0.1 M Imidazole buffer. The enzyme extract is added to the reaction cell along with the ammonium salt of linoleic acid. Oxygen uptake is measured using a YSI $O_2$ electrode assembly at 25° C. Degree of enzymic activity is recorded as the rate of oxygen decay in the cell during oxidation of the substrate.

Residual LPO is calculated as the ratio of the oxygen decay rate of a flour sample obtained from a treated grain sample to the oxygen decay rate of a flour sample obtained from untreated flour.

Peroxidase activity can be detected as a color change reaction with a guaiacol solution and hydrogen peroxide. The test procedure comprises blending a 10 gram sample of a flour to be tested with 300 cubic centimeters (cc) of distilled water. Blending is performed at a grind speed for one minute and the contents are then filtered through a cotton milk filter. Next, two cc of the filtrate is added to 20 cc of distilled water in a test tube, followed by the addition of 1 cc of an aqueous solution comprising 0.5% by weight guaiacol in 50% by volume ethyl alcohol, without mixing. Then, 1 cc of a solution comprising 0.08% by weight hydrogen peroxide is added, without mixing. The hydrogen peroxide solution comprises 2.8 cc of 30% by volume hydrogen peroxide per liter, and is used fresh, that is, within two weeks of forming the solution. The contents of the test tube are then mixed thoroughly by inverting the tube. If no color develops within 3.5 minutes, the test for peroxidase activity is considered negative. In the case of a positive test, color development will be of sufficient intensity to be adequately recognized. The test tube may be compared to a control comprising 22 cc of distilled water and 2 cc of the filtrate, with neither guaiacol solution nor hydrogen peroxide.

Example 1

A bulk sample comprising 40,000 pounds of whole wheat berries was processed as follows: The berries with an initial moisture content of about 14.1% by weight were tempered for 120 minutes with 5% by weight added water to achieve a moisture content of about 19.1% by weight. The moistened berries were then placed in an IR energy treatment device known as a micronizer, available from Micronizer, Inc., and irradiated with IR energy until they reached a surface temperature of about 95° C. The heated berries were then removed from the micronizer and placed in a holding tank for a residence time of 45 minutes where they maintained a residence temperature of about 83° C. After the residence time in the holding tank, the berries were then cooled with ambient air to room temperature. The treated and cooled berries were then placed in a card-board container for storage. The treated berries were milled to obtain a treated graham flour.

Example 2

A bulk sample comprising 40,000 pounds of whole wheat berries was processed as follows: The berries having an initial moisture content of about 14.1% by weight were tempered for 120 minutes with 5% by weight added water to achieve a moisture content of about 19.1% by weight. The moistened berries were then placed in a micronizer, available from Micronizer, Inc., and irradiated with IR energy until they reached a surface temperature of about 105° C. The heated berries were then removed from the micronizer and placed in a holding tank for a residence time of 30 minutes where they maintained a residence temperature of about 91° C. After the residence time in the holding tank, the berries were then cooled with ambient air to room temperature. The treated and cooled berries were then placed in a card-board container for storage. The treated berries were milled to obtain a treated graham flour.

Shelf-Life Study

EXAMPLE A

The treated graham flours from Example 1 and from Example 2 were combined to form a composite treated graham flour (Example A). The Example A composite flour was tested for residual lipase activity and very little residual lipase activity was detected. Lipoxygenase activity of approximately 1.5% to about 2.0% LPO was detected. Lipase and LPO were considered to have been substantially inactivated by the treatment.

A control sample comprising 40,000 pounds of untreated graham flour was also milled for comparative purposes (Control A).

The Example A flour and the Control A flour were distributed into pint-size mason jars in 150 gram portions. The jars were sealed and stored under shelf-life ambient storage conditions at a temperature of 83° F. with 60% relative humidity. Samples were removed approximately once every week for the first six weeks of the study and removed approximately every two weeks for the remaining six weeks of the study. The study lasted a total of 86 days. The samples were analyzed for free fatty acids (FFA) content, as an indicator of lipase activity. The results of the FFA analysis are reported in Table I as % FFA, representing the percentage of free fatty acids found by gas chromatography in the extractable lipid portion of the flour. The relationship between % FFA and the number of days in storage, for both the Example A flour and for the Control A flour, is shown in Table I:

TABLE I

| Days After Milling | % Free Fatty Acids | | |
|---|---|---|---|
| | Control A | Example A | Regression |
| 0 | — | — | 3.31 |
| 3 | 7.5 | 4.2 | 3.577 |
| 9 | 10.3 | 3.8 | 4.111 |
| 15 | 11.4 | 4.4 | 4.645 |
| 24 | 16.9 | 5.1 | 5.446 |
| 31 | 21.6 | 6.1 | 6.069 |
| 37 | 20.8 | 6.9 | 6.603 |
| 44 | 23.2 | 7.3 | 7.226 |
| 63 | 21.8 | 9 | 8.917 |
| 71 | 20.9 | 10.8 | 9.629 |
| 86 | 26.6 | 10.3 | 10.964 |
| 90 | — | — | 11.32 |

As can be seen from Table I, the Example A flour showed much greater shelf-life stability than the control flour, generating much less free fatty acids and at a much slower rate than the control. The Control A graham flour had 10.3% FFA after nine days of storage while it took between 63 and 71 days for the Example A flour to reach the same % FFA value.

The major improvement in shelf-life stability of the Example A flour relative to the Control A flour was realized despite the fact that the Example A flour had some residual lipase and LPO activity after the IR energy and heat treatments. Thus, even better shelf-life stability is expected for graham flours according to preferred embodiments of the invention, wherein lipase and LPO are completely inactivated by the heat treatment. The improved shelf-life stability is expected for preferred graham flours whether the treatment involves only an IR energy treatment or both IR energy and subsequent heat treatments.

The study also involved a subjective evaluation of headspace odors of the samples. The samples were sniffed by trained experts upon opening to determine the presence of volatile odors. Throughout the 86 day period after milling, the Example A flour had a very clean, roasted odor. For the Control A flour, slightly rancid off notes were detected from approximately halfway through the study, and became more noticeable by the end of the study. The increase in detected volatile odors explains the leveling off of the free fatty acids in the control flour, where the generation of free fatty acids was offset by their further breakdown to volatile oxidative products.

Example 3

A bulk sample comprising 40,000 pounds of whole wheat berries and having a moisture content of about 14% by weight was tempered for about 120 minutes with 5% by weight added water to achieve a moisture content of from about 17% by weight to about 19% by weight. The tempered berries were then placed in a micronizer, and the berries were exposed to the IR source until they reached a surface temperature of 105° C. as measured with a temperature probe centrally positioned within the lot of berries. Once the temperature of 105° C. was reached, the IR energy source was turned off and the heated berries were immediately removed from the micronizer and placed in a residence holding bin where they remained hot, at a temperature of about 101° C. No external heating was applied to the holding bin, but the insulating properties of the bin enabled the berries to maintain a residence temperature of about 101° C. within the holding bin. After a residence time in the holding bin of about 30 minutes, the berries were removed from the bin, spread out on a cooling conveyor and contacted with air blown by a fan to cool them.

The cooled berries had a moisture content of 13.7% by weight. The percent starch gelatinization was 9.1%. The SRC value was 85. No active lipase was detected, and the percent of residual LPO was zero (0). Peroxidase activity was determined to be borderline positive/negative.

Examples 4–28 and Comparatives 1–6

To determine the optimum conditions for IR energy treatments and subsequent heat treatments 36 samples were prepared under various process conditions. The samples were run as either bulk samples comprising 40,000 pounds of whole wheat berries, or as batch samples comprising 198 pounds (90 Kg) of whole wheat berries. Comparative 1, and Examples 1, 2, 10, 22 and 28, were bulk samples. The rest of the Comparatives and Examples were batch samples. For each sample, the berries were tempered to achieve moisture contents of from about 15.6% by weight to about 19.1% by weight. The initial moisture contents, tempering conditions, and approximate moisture contents of the tempered samples for each of the Comparatives and Examples are shown in Table II:

TABLE II

| SAMPLE | SAMPLE SIZE | INITIAL MOISTURE CONTENT OF BERRIES (% BY WEIGHT) | TEMPERING CONDITIONS | | MOISTURE CONTENT OF BERRIES AFTER IR, HEATING AND COOLING (% BY WEIGHT) |
|---|---|---|---|---|---|
| | | | WATER ADDED (% BY WEIGHT) | TIME (MINUTES) | |
| COMPARATIVE 1 | BULK | 13.6 | 5 | 120 | 14.1 |
| EXAMPLE 1 | BULK | 14.1 | 5 | 120 | 13.8 |
| EXAMPLE 2 | BULK | 14.1 | 5 | 120 | 13.2 |
| EXAMPLE 3 | BATCH | 13.6 | 5 | 120 | 14.1 |
| EXAMPLE 4 | BATCH | 13.6 | 5 | 120 | 14.1 |
| COMPARATIVE 2 | BATCH | 13.6 | 2 | 90 | 13 |
| COMPARATIVE 3 | BATCH | 13.6 | 2 | 120 | 12.6 |
| COMPARATIVE 4 | BATCH | 13.6 | 3.5 | 30 | 13.8 |
| EXAMPLE 5 | BATCH | 13.6 | 5 | 30 | 13.2 |
| EXAMPLE 6 | BATCH | 13.6 | 5 | 120 | 15 |
| EXAMPLE 7 | BATCH | 14 | 2 | 30 | 12.4 |
| EXAMPLE 8 | BATCH | 14 | 3.5 | 120 | 14.1 |
| EXAMPLE 9 | BATCH | 14 | 5 | 90 | 13.3 |
| EXAMPLE 10 | BULK | 14 | 5 | 120 | 13.7 |

TABLE II-continued

| SAMPLE | SAMPLE SIZE | INITIAL MOISTURE CONTENT OF BERRIES (% BY WEIGHT) | TEMPERING CONDITIONS | | MOISTURE CONTENT OF BERRIES AFTER IR, HEATING AND COOLING (% BY WEIGHT) |
|---|---|---|---|---|---|
| | | | WATER ADDED (% BY WEIGHT) | TIME (MINUTES) | |
| EXAMPLE 11 | BATCH | 14 | 2 | 30 | 10.3 |
| EXAMPLE 12 | BATCH | 14 | 2 | 120 | 11.5 |
| EXAMPLE 13 | BATCH | 14 | 3.5 | 90 | 13.2 |
| EXAMPLE 14 | BATCH | 14 | 5 | 30 | 11.7 |
| COMPARATIVE 5 | BATCH | 13.6 | 5 | 120 | 11.8 |
| COMPARATIVE 6 | BATCH | 13.6 | 5 | 240 | 12.1 |
| EXAMPLE 15 | BATCH | 13.3 | 4.25 | 120 | 12.8 |
| EXAMPLE 16 | BATCH | 13.3 | 5 | 120 | 13.3 |
| EXAMPLE 17 | BATCH | 13.3 | 5 | 120 | 12.7 |
| EXAMPLE 18 | BATCH | 13.3 | 5 | 60 | 12.4 |
| EXAMPLE 19 | BATCH | 13.3 | 5 | 90 | 13.1 |
| EXAMPLE 20 | BATCH | 13.3 | 5.5 | 120 | 13.2 |
| EXAMPLE 21 | BATCH | 13.3 | 5.5 | 60 | 12 |
| EXAMPLE 22 | BULK | 13.3 | 5 | 120 | 12.7 |
| EXAMPLE 23 | BATCH | 13.3 | 5 | 120 | 13.6 |
| EXAMPLE 24 | BATCH | 13.3 | 5 | 120 | 13 |
| EXAMPLE 25 | BATCH | 13.3 | 5 | 120 | 12.3 |
| EXAMPLE 26 | BATCH | 13.3 | 5 | 120 | 12.6 |
| EXAMPLE 27 | BATCH | 13.3 | 5 | 120 | 12.5 |
| EXAMPLE 28 | BULK | 13.3 | 5.125 | 120 | 12.5 |

The moistened berries were then subjected to IR energy in a micronizer device to until they reached a temperature of from about 90° C. to about 120° C. For each of the samples, IR energy treatment lasted for about 30 seconds to about 60 seconds. Some of the samples were then subjected to a subsequent heat treatment at a temperature and for a time period as shown in Table III below. The moisture contents of the treated berries are shown in Table II above. The treated berries from each sample were then milled and the resultant flours were analyzed to determine their properties according to the methods and procedures described above. The results of these analyses are shown in Table III below. In Table III, a series of three dashes (---) indicates that data was not available for the respective particular condition or property. In Table III, a single dash (-) represents a negative result:

TABLE III

| | PROCESS CONDITIONS | | | PROPERTIES | | | | |
|---|---|---|---|---|---|---|---|---|
| | INFRARED | HEAT TREATMENT | | PERCENT | | | | |
| SAMPLE | ENERGY TREATMENT (MICRONIZER EXIT TEMP ° C.) | RESIDENCE TIME (MIN) | RESIDENCE TEMP (° C.) | GELATINIZED MEASURED BY DSC (%) | SOLVENT RETENTION CAPACITY VALUE | RESIDUAL LIPOXYGENASE (%) | LIPASE ACTIVITY (+ or -) | PEROXIDASE ACTIVITY (GUAIACOL) (+ or -) |
| COMPARATIVE 1 | 95 | 0 | N/A | 3.6 | — | 33 | — | + |
| EXAMPLE 1 | 99 | 45 | 83 | 14 | 75 | 2 | — | + |
| EXAMPLE 2 | 105 | 30 | 91 | 11 | 81 | 0 | — | + |
| EXAMPLE 3 | 95 | 30 | — | 4.8 | 65 | 7 | — | + |
| EXAMPLE 4 | 95 | 60 | — | 7.5 | 67 | 2 | — | + |
| COMPARATIVE 2 | 90 | 30 | 74 | 5.3 | 65 | 15 | + | + |
| COMPARATIVE 3 | 90 | 0 | N/A | 6.1 | 64 | 21 | + | + |
| COMPARATIVE 4 | 90 | 0 | N/A | 9.1 | 65 | 30 | + | + |
| EXAMPLE 5 | 90 | 60 | 68 | 6.8 | 65 | 9 | + | + |
| EXAMPLE 6 | 90 | 60 | 72 | 11 | 66 | 8 | + | + |
| EXAMPLE 7 | 105 | 60 | 85 | 6.7 | 66 | 0 | + | + |
| EXAMPLE 8 | 105 | 30 | 83 | 8.6 | 77 | 0 | - | +/- |
| EXAMPLE 9 | 105 | 0 | N/A | 10.3 | 71 | 0 | - | +/- |
| EXAMPLE 10 | 105 | 30 | 101 | 9.1 | 85 | 0 | - | +/- |
| EXAMPLE 11 | 120 | 0 | N/A | 9.3 | 79 | 0 | - | - |
| EXAMPLE 12 | 120 | 0 | N/A | 13.3 | 81 | 0 | - | - |
| EXAMPLE 13 | 120 | 60 | 93 | 16.5 | 91 | 0 | - | - |
| EXAMPLE 14 | 120 | 30 | 90 | 17.6 | 87 | 0 | - | - |
| COMPARATIVE 5 | 120 | 60 | 93 | 29.1 | 99 | 0 | - | - |
| COMPARATIVE 6 | 120 | 30 | 92 | 30 | 101 | 0 | - | - |
| EXAMPLE 15 | 105 | 10 | 88 | — | 81 | 0 | - | - |
| EXAMPLE 16 | 100 | 10 | 86 | — | 85 | 0 | - | - |
| EXAMPLE 17 | 110 | 10 | 91 | — | 87 | 0 | - | - |

TABLE III-continued

| | PROCESS CONDITIONS | | | PROPERTIES | | | | |
| | INFRARED | HEAT TREATMENT | | PERCENT | | | | |
| SAMPLE | ENERGY TREATMENT (MICRONIZER EXIT TEMP ° C.) | RESIDENCE TIME (MIN) | RESIDENCE TEMP (° C.) | GELATINIZED MEASURED BY DSC (%) | SOLVENT RETENTION CAPACITY VALUE | RESIDUAL LIPOXYGENASE (%) | LIPASE ACTIVITY (+ or −) | PEROXIDASE ACTIVITY (GUAIACOL) (+ or −) |
|---|---|---|---|---|---|---|---|---|
| EXAMPLE 18 | 105 | 10 | 85 | — | 80 | 0 | − | − |
| EXAMPLE 19 | 105 | 10 | 86 | — | 84 | 0 | − | − |
| EXAMPLE 20 | 105 | 10 | 88 | — | 79 | 0 | − | − |
| EXAMPLE 21 | 105 | 10 | 88 | — | 84 | 0 | − | − |
| EXAMPLE 22 | 105 | 10 | 107 | — | 84 | 0 | − | − |
| EXAMPLE 23 | 95 | 0 | N/A | — | 72 | 3 | + | + |
| EXAMPLE 24 | 100 | 0 | N/A | — | 71 | 4 | + | + |
| EXAMPLE 25 | 103 | 0 | N/A | — | 75 | 0 | + | + |
| EXAMPLE 26 | 103 | 5 | 100 | — | 74 | 0 | + | + |
| EXAMPLE 27 | 108 | 5 | 100 | — | 80 | 1 | + | + |
| EXAMPLE 28 | 105 | 5 | 102 | — | 84 | 0 | − | − |

As can be seen from Tables II and III above, graham flours can be produced according to the present invention by treating whole wheat berries with IR energy for a period of time sufficient to heat the moistened berries to a surface temperature of from about 90° C. to about 120° C., followed by an elevated temperature treatment at from about 80° C. to about 110° C. Tables II and III indicate that a heat treatment comprising both an IR energy treatment and an elevated temperature treatment is particularly effective for treating berries which have been moistened to a moisture content of from about 15% by weight to about 20% by weight. Examples 1–28 demonstrate that the desired properties such as extent of gelatinization, SRC value, and enzyme activity can be achieved by treating the berries under various process conditions. The process conditions can be varied to eliminate post-IR heat treatment and yet still obtain berries with desired characteristics.

Insufficient heat treatment, such as lower micronizer temperatures and no post-IR heat treatment or short residence times, as per Comparatives 1–4 results in insufficient inactivation of lipase and LPO.

Tempering for longer time periods combined with high micronizer temperatures and prolonged residence times, while completely inactivating the enzymes, results in an undesirably high extent of gelatinization and high SRC values, as evidenced by comparative 5.

Overtreating the berries with water, or tempering for prolonged times, prior to the IR treatment results in a degree of gelatinization which exceeds 20% and in unacceptable SRC values of about 100, as evidenced by Comparative 6. It is believed that the longer tempering times, such as in Comparative 6 (about 240 minutes), allow the moisture added for tempering to penetrate more deeply into the whole wheat berries. Thus, upon treating berries that have been tempered for about 240 minutes with IR energy and then with heat, moisture in the interior of the berries heats up and causes gelatinization of starch inside the berries. It is further believed that shorter tempering times of about 30 minutes to about 120 minutes result in added moisture retention in exterior portions of the berries without moisture penetration deep into the berries. Thus, upon treating the berries with IR energy and heat, the moisture in the exterior of the berries heats up, inactivating lipase and LPO in exterior portions of the berries without enhancing starch gelatinization in the interior part of the berries.

Example 29 and Control

Crunchy texture

Baked wheat crackers were made from untreated whole wheat flour (Control B) and from whole wheat flour treated according to the present invention (Example 29). The flour used to make the crackers of Example 29 had zero (0) lipase activity, a substantially inactivated LPO content, and less than 20% gelatinized starch prior to baking. With the exception of the different flours, the ingredients and compositions of the Control B crackers were the same as those of the Example 29 crackers.

The crackers were compared by 508 randomly selected respondents to determine overall preference of the crackers. Of the respondents, 52% preferred the Example 29 crackers made from the whole wheat flour treated according to the present invention. Only 36% of the respondents preferred the Control B crackers and 12% of respondents had no preference for one cracker over the other. One reason 52% of the respondents preferred the Example 29 crackers was because the crackers were crunchier than the Control B crackers. It is apparent that crackers made from whole wheat flour treated according to the invention are crunchier than crackers made from untreated whole wheat flour.

Examples 30 and 31 and Controls C and D

To determine the effect on crunchiness of crackers made with flour treated according to the invention instead of untreated flour, the elastic modulus of the crackers was compared to that of crackers made with untreated flour. Examples 30 and 31 are baked crackers made from the whole wheat flour treated according to the methods of the present invention. The treatment was sufficient to inactivate lipase in the berries and to substantially inactivate LPO in the berries, while causing less than 20% gelatinization of starch in the berries. The baked crackers of Controls C and D were made from flour of untreated whole wheat berries having zero (0) % gelatinized starch before baking.

Crackers of each sample were packaged and stored for a period of 180 days before testing. The crackers of Controls C and D and of Example 30, were packaged in respective coextruded packaging materials comprising high-density polypropylene. The crackers of Example 31 were packaged in a metallized packaging material comprising oriented polypropylene to determine if the different packaging material would have an effect on the crunchiness of the stored crackers.

Crunch of the crackers was measured as the modulus (dynes/cm$^2$) of elasticity of the crackers as tested with an Instron device. The higher the modulus value of the cracker, the crunchier the cracker is. For each sample, 15 crackers were tested and the mean modulus value of each sample is reported in Table IV:

TABLE IV

| SAMPLE | PACKAGING | MODULUS (dynes/cm$^2$) |
|---|---|---|
| CONTROL C | COEXTRUDED | 460 |
| EXAMPLE 30 | COEXTRUDED | 731 |
| EXAMPLE 31 | METALLIZED | 739 |
| CONTROL D | COEXTRUDED | 472 |

As can be seen from Table IV, the different packaging had little effect on the crunchiness of the crackers. Table IV indicates that the Example 30 and Example 31 crackers made with flour from whole wheat berries treated according to the invention were much crunchier than the crackers of Controls C and D, which were made with flour of untreated berries. It has been found according to the invention that the pre-gelatinization of up to about 20% of the starch in the berries provides a flour which can be made into a machinable dough and baked to form an extremely crunchy product.

We claim:

1. A process for making reduced fat, low fat or no-fat graham crackers comprising:
   (A) subjecting whole wheat berries to a heat treatment comprising exposure to infrared (IR) energy under conditions sufficient to at least substantially inactivate lipase and lipoxygenase while controlling the extent of gelatinization of starch in the whole berries,
   (B) cooling the heated whole berries after said heat treatment to prevent further gelatinization of the starch;
   (C) if the moisture content of the cooled berries is not within the range of from about 10% by weight to about 15% by weight, treating the cooled whole berries to obtain a moisture content of from about 10% by weight to about 15% by weight;
   (D) comminuting the cooled whole berries having a moisture content of from about 10% by weight to about 15% by weight to obtain a graham flour;
   (E) admixing the graham flour with ingredients comprising water to form a machinable dough;
   (F) forming the dough into pieces; and
   (G) baking the pieces to obtain a cracker having a crunchy texture,
   wherein the whole wheat berries have a moisture content of from about 15% by weight to about 20% by weight immediately prior to said exposure to IR energy, and wherein said extent of gelatinization of starch in said whole wheat berries remains less than 20%, as determined by differential scanning calorimetry (DSC).

2. A process as claimed in claim 1, wherein step (A) further comprises maintaining the whole berries at an elevated temperature for a period of time subsequent to the IR energy treatment.

3. A process as claimed in claim 1, wherein said process further includes moistening whole berries prior to said exposure to IR energy to obtain said berries having a moisture content of from about 15% by weight to about 20% by weight.

4. A process as claimed in claim 3, wherein said moistening the whole berries comprises tempering the whole berries with water.

5. A process as claimed in claim 1, wherein said extent of gelatinization of the starch in the berries is less than about 10%, as determined by DSC.

6. A process as claimed in claim 1, wherein said whole wheat berries have a moisture content of from about 17 to about 19% immediately prior to said exposure to IR energy.

7. A process for making reduced fat, low fat or no-fat graham crackers comprising:
   (A) subjecting whole wheat berries to a heat treatment, said heat treatment comprising exposure to infrared (IR) energy to heat said berries to a first temperature of from about 90° C. to about 120° C. for a first period of time, said heat treatment being sufficient to at least substantially inactivate lipase and lipoxygenase while controlling the extent of gelatinization of starch in the whole berries;
   (B) cooling the heated whole berries promptly after said heat treatment to a temperature of about 73° C. or lower to prevent further gelatinization of the starch;
   (C) if the moisture content of the cooled berries is not within the range of from about 10% by weight to about 15% by weight, adjusting the moisture content of the cooled whole berries to be from about 10% by weight to about 15% by weight;
   (D) comminuting the cooled whole berries having a moisture content of from about 10% by weight to about 15% by weight to obtain a graham flour;
   (E) admixing the graham flour with ingredients comprising water to form a machinable dough;
   (F) forming the dough into pieces; and
   (G) baking the pieces to obtain a cracker having a crunchy texture, wherein said berries have a moisture content of from about 15% by weight to about 20% by weight immediately prior to said heat treatment,
   and wherein said extent of gelatinization of starch in said whole wheat berries remains less than about 20%, as determined by differential scanning calorimetry.

8. A process as claimed in claim 7, wherein said heat treatment further comprises maintaining the whole berries at a second temperature of from about 80° C. to about 110° C. for a second period of time subsequent to said IR energy exposure.

9. A process as claimed in claim 7, wherein said process further comprises moistening whole wheat berries prior to said heat treatment to adjust the moisture content of said berries to be from about 15% by weight to about 20% by weight.

10. A process as claimed in claim 9, wherein said moisture content of said whole wheat berries is adjusted to be within the range of from about 17% by weight to about 19% by weight.

11. A process as claimed in claim 9, wherein said moistening of whole wheat berries comprises tempering said berries by adding water to said berries and allowing the added water to be absorbed by said berries for a period of time ranging from about 10 minutes to about 120 minutes.

12. A process as claimed in claim 7, wherein said extent of gelatinization is from about 5% to about 15% of the total starch in the berries, as determined by D.S.C.

13. A process as claimed in claim 7, wherein said extent of gelatinization is from about 8% to about 12% of the total starch in the berries, as determined by D.S.C.

14. A process as claimed in claim 7, wherein said moisture content of the cooled berries is from about 12% by weight to about 14% by weight.

15. A process as claimed in claim 8, wherein said second period of time is at least about 8 minutes.

16. A process as claimed in claim 7, wherein said exposure of said whole wheat berries to said IR energy takes place in a micronizer.

17. A process as claimed in claim 8, wherein said second temperature is from about 85° C. to about 100° C.

18. A process as claimed in claim 8, wherein said first period of time is from about 30 seconds to about 60 seconds.

19. A process as claimed in claim 8, wherein said second temperature is from about 85° C. to about 95° C., and said second period of time is from about 8 minutes to about 10 minutes.

20. A process for making shelf-stable graham flour which provides a crunchy texture in baked goods comprising:
    (A) subjecting whole wheat berries to a heat treatment comprising exposure to infrared (IR) energy under conditions sufficient to at least substantially inactivate lipase and lipoxygenase while controlling the extent of gelatinization of starch in the whole berries,
    (B) cooling the heated whole berries after said heat treatment to prevent further gelatinization of the starch;
    (C) if the moisture content of the cooled berries is not within the range of from about 10% by weight to about 15% by weight, treating the cooled whole berries to obtain a moisture content of from about 10% by weight to about 15% by weight; and
    (D) comminuting the cooled berries to obtain a graham flour,
wherein the whole wheat berries have a moisture content of from about 15 to about 20% immediately prior to said exposure to IR energy, and wherein said extent of gelatinization of starch in said whole wheat berries remains less than about 20%, as determined by differential scanning calorimetry (DSC).

21. A process as claimed in claim 20, wherein said process further includes moistening whole wheat berries prior to said heat treatment to obtain said berries having a moisture content of from about 15% by weight to about 20% by weight.

22. A process as claimed in claim 20, wherein said heat treatment further comprises maintaining the berries at an elevated temperature for a period of time subsequent to said exposure to IR energy.

23. A process as claimed in claim 21, wherein moistening the whole berries comprises tempering the whole berries.

24. A process as claimed in claim 20, wherein said extent of gelatinization is less than about 10% of the total starch in the berries as determined by DSC.

25. A process as claimed in claim 20, wherein said whole wheat berries have a moisture content of from about 17 to about 19% immediately prior to said exposure to IR energy.

26. A process for making shelf-stable graham flour which provides a crunchy texture in baked goods comprising:
    (A) subjecting whole wheat berries to a heat treatment, said heat treatment comprising exposure to infrared (IR) energy to heat said berries to a first temperature of from about 90° C. to about 120° C. for a first period of time, said heat treatment being sufficient to at least substantially inactivate lipase and lipoxygenase while controlling the extent of gelatinization of starch in the whole berries;
    (B) cooling the heated whole berries promptly after said heat treatment to a temperature of about 73° C. or lower to prevent further gelatinization of the starch;
    (C) if the moisture content of the cooled berries is not within the range of from about 10% by weight to about 15% by weight, adjusting the moisture content of the cooled whole berries to be from about 10% by weight to about 15% by weight; and
    (D) comminuting the cooled whole berries having a moisture content of from about 10% by weight to about 15% by weight to obtain a graham flour;
wherein said berries have a moisture content of from about 15% by weight to about 20% by weight immediately prior to said heat treatment,
and wherein said extent of gelatinization of starch remains less than about 20% of the total starch in the berries, as determined by differential scanning calorimetry (DSC).

27. A process as claimed in claim 26, wherein said heat treatment further comprises maintaining the whole berries at a second temperature of from about 80° C. to about 110° C. for a second period of time subsequent to said IR energy exposure.

28. A process as claimed in claim 26, wherein prior to said heat treatment said process further comprises moistening whole wheat berries to obtain said berries having a moisture content of from about 15% by weight to about 20% by weight.

29. A process as claimed in claim 28, wherein said moisture content of said whole wheat berries prior to said heat treatment is within the range of from about 17% by weight to about 19% by weight.

30. A process as claimed in claim 28, wherein said moistening of whole wheat berries comprises tempering said berries by adding water to said berries and allowing the added water to be absorbed by said berries for a period of time ranging from about 10 minutes to about 120 minutes.

31. A process as claimed in claim 26, wherein said extent of gelatinization is from about 5% to about 15% of the total starch in the berries as determined by differential scanning calorimetry (DSC).

32. A process as claimed in claim 26, wherein said extent of gelatinization is from about 8% to about 12% as determined by DSC.

33. A process as claimed in claim 26, wherein said moisture content of the cooled berries is from about 12% by weight to about 14% by weight.

34. A process as claimed in claim 27, wherein said second period of time is at least about 8 minutes.

35. A process as claimed in claim 26, wherein said exposure of said whole wheat berries to said IR energy takes place in a micronizer.

36. A process as claimed in claim 27, wherein said second temperature is from about 85° C. to about 100° C.

37. A process as claimed in claim 27, wherein said first period of time is from about 30 seconds to about 60 seconds.

38. A process as claimed in claim 27, wherein said second temperature is from about 85° C. to about 95° C., and said second period of time is from about 8 minutes to about 10 minutes.

39. A process as defined in claim 26 further comprising packaging said flour in a container.

40. A process according to claim 1 further comprising the step of packaging said graham cracker in a metallized packaging film.

41. A process according to claim 7 further comprising the step of packaging said graham cracker in a metallized packaging film.

42. A process for making graham crackers comprising:
    (A) subjecting whole wheat berries to a heat treatment comprising exposure to infrared (IR) energy under conditions sufficient to at least substantially inactivate lipase and lipoxygenase while controlling the extent of gelatinization of starch in the whole berries;

(B) cooling the heated whole berries after said heat treatment to prevent further gelatinization of the starch;

(C) comminuting the cooled whole berries to obtain a graham flour;

(D) admixing the graham flour with ingredients comprising water to form a machinable dough;

(E) forming the dough into pieces; and (F) baking the pieces to obtain a cracker having a crunchy texture.

43. Process for making graham crackers comprising:

(A) subjecting whole wheat berries to a heat treatment, said heat treatment comprising exposure to infrared (IR) energy to heat said berries to a first temperature of from about 90° C. to about 120° C. for a first period of time, said heat treatment being sufficient to at least substantially inactivate lipase and lipoxygenase while controlling the extent of gelatinization of starch in the whole berries;

(B) cooling the heated whole berries promptly after said heat treatment to prevent further gelatinization of the starch;

(C) comminuting the cooled whole berries to obtain a graham flour;

(D) admixing the graham flour with ingredients comprising water to form a machinable dough;

(E) forming the dough into pieces; and (F) baking the pieces to obtain a cracker having a crunchy texture.

44. A process for making shelf-stable graham flour which provides a crunchy texture in baked goods comprising:

(A) subjecting whole wheat berries to a heat treatment comprising exposure to infrared (IR) energy under conditions sufficient to at least substantially inactivate lipase and lipoxygenase while controlling the extent of gelatinization of starch in the whole berries, (B) cooling the heated whole berries after said heat treatment to prevent further gelatinization of the starch; and (C) comminuting the cooled berries to obtain a graham flour.

45. A process for making shelf-stable graham flour which provides a crunchy texture in baked goods comprising:

(A) subjecting whole wheat berries to a heat treatment, said heat treatment comprising exposure to infrared (IR) energy to heat said berries to a first temperature of from about 90° C. to about 120° C. for a first period of time, said heat treatment being sufficient to at least substantially inactivate lipase and lipoxygenase while controlling the extend of gelatinization of starch in the whole berries;

(B) cooling the heated whole berries promptly after said heat treatment to prevent further gelatinization of the starch; and (C) comminuting the cooled whole berries to obtain a graham flour.

46. A process according to claim 42 wherein after cooling step (B) and prior to said comminuting step (C), if the moisture content of the cooled berries is not within the range of from about 10% by weight to about 15% by weight, the process comprises the step of:

treating the cooled whole berries to obtain a moisture content of from about 10% by weight to about 15% by weight.

47. A process according to claim 42 wherein the whole wheat berries have a moisture content of from about 15% by weight to about 20% by weight immediately prior to said exposure to IR energy.

48. A process according to claim 42 wherein said extent of gelatinization of starch in said whole wheat berries remains less than 20% of the total starch in the berries, as determined by differential scanning calorimetry (DSC).

49. A process according to claim 43 wherein after cooling step (B) and prior to comminuting step (C), if the moisture content of the cooled berries is not within the range of from about 10% by weight to about 15% by weight, the process comprises the step of:

adjusting the moisture content of the cooled whole berries to be from about 10% by weight to about 15% by weight.

50. A process according to claim 43 wherein in said cooling step (B), the berries are cooled to a temperature of about 73° C. or lower.

51. A process according to claim 43 wherein said berries have a moisture content of from about 15% by weight to about 20% by weight immediately prior to said heat treatment.

52. A process according to claim 43 wherein said extent of gelatinization of starch in said whole wheat berries remains less than about 20% of the total starch in the berries, as determined by differential scanning calorimetry (DSC).

53. A process according to claim 44 wherein after heat treating and cooling said berries and before comminuting them, if the moisture content of the cooled berries is not within the range of from about 10% by weight to about 15% by weight, treating the cooled whole berries to obtain a moisture content of from about 10% by weight to about 15% by weight.

54. A process according to claim 44 wherein said extent of gelatinization of starch in said whole wheat berries remains less than about 20% of the total starch in the berries, as determined by differential scanning calorimetry (DSC).

55. A process according to claim 44 wherein said berries have a moisture content of from about 15% by weight to about 20% by weight immediately prior to said heat treatment.

56. A process according to claim 45 wherein after heat treating and cooling said berries and before comminuting them, if the moisture content of the cooled berries is not within the range of from about 10% by weight to about 15% by weight, adjusting the moisture content of the cooled whole berries to be from about 10% by weight to about 15% by weight.

57. A process according to claim 45 wherein, in said cooling step (B), said berries are cooled to a temperature of about 73° C. or lower.

58. A process according to claim 45 wherein said berries have a moisture content of from about 15% by weight to about 20% by weight immediately prior to said heat treatment.

59. A process according to claim 45 wherein said extent of gelatinization of starch remains less than about 20% of the total starch in the berries, as determined by differential scanning calorimetry (DSC).

60. A process as claimed in claim 45 wherein the peroxidase is not completely inactivated.

* * * * *